United States Patent
Bobbitt, III et al.

(10) Patent No.: US 9,754,469 B2
(45) Date of Patent: Sep. 5, 2017

(54) SYSTEM FOR TAMPER IDENTIFICATION

(71) Applicant: Savannah River Nuclear Solutions, LLC, Aiken, SC (US)

(72) Inventors: John Thomas Bobbitt, III, Evans, GA (US); George E. Weeks, Trenton, SC (US)

(73) Assignee: SAVANAH RIVER NUCLEAR SOLUTIONS, LLC, Aiken, SC (US)

( * ) Notice: Subject to any disclaimer, the term of this patent is extended or adjusted under 35 U.S.C. 154(b) by 167 days.

(21) Appl. No.: 14/799,844

(22) Filed: Jul. 15, 2015

(65) Prior Publication Data
US 2016/0049057 A1  Feb. 18, 2016

Related U.S. Application Data
(60) Provisional application No. 62/024,602, filed on Jul. 15, 2014.

(51) Int. Cl.
| | |
|---|---|
| *G06K 9/00* | (2006.01) |
| *G08B 13/24* | (2006.01) |
| *G06K 9/62* | (2006.01) |
| *G06T 7/00* | (2017.01) |
| *F16B 41/00* | (2006.01) |

(52) U.S. Cl.
CPC .......... *G08B 13/248* (2013.01); *F16B 41/005* (2013.01); *G06K 9/6202* (2013.01); *G06T 7/001* (2013.01)

(58) Field of Classification Search
None
See application file for complete search history.

(56) References Cited

U.S. PATENT DOCUMENTS

| | | | |
|---|---|---|---|
| 3,718,066 A * | 2/1973 | Dally | F16B 31/02 |
| | | | 356/34 |
| 3,854,372 A | 12/1974 | Gutshall | |
| 3,890,876 A | 6/1975 | Dahl | |
| 4,428,240 A | 1/1984 | Schoeps | |
| 4,446,979 A | 5/1984 | Gach et al. | |
| 4,607,547 A * | 8/1986 | Martus | B25B 13/065 |
| | | | 30/168 |
| 5,449,260 A | 9/1995 | Whittle | |
| 5,970,798 A | 10/1999 | Gleman et al. | |

(Continued)

FOREIGN PATENT DOCUMENTS

WO   WO 94/06006   3/1994

OTHER PUBLICATIONS

Viz Torque, https://www.vibra-tite.com/wp-content/uploads/Viz-Torque-PDS.pdf, pp. 1-2.*

(Continued)

*Primary Examiner* — Jayesh A Patel
(74) *Attorney, Agent, or Firm* — Dority & Manning, P.A.

(57) ABSTRACT

A system for tamper identification. A fastener has a tamper identification surface with a unique grain structure that is altered if the fastener is removed or otherwise exposed to sufficient torque. After a period of time such as e.g., shipment and/or storage of the sealed container, a determination of whether tampering has occurred can be undertaken by examining the grain structure to determine if it has changed since the fastener was used to seal the container or secure the device.

17 Claims, 13 Drawing Sheets

(56) References Cited

U.S. PATENT DOCUMENTS

| | | | |
|---|---|---|---|
| 6,402,447 B1 | 6/2002 | Babak | |
| 6,791,465 B2 | 9/2004 | Blagin et al. | |
| 6,829,944 B1* | 12/2004 | Gleman | G01L 5/24 |
| | | | 73/761 |
| 7,024,938 B2 | 4/2006 | Gleman et al. | |
| 7,150,594 B2 | 12/2006 | Keener | |
| 7,317,401 B2 | 1/2008 | Germann et al. | |
| 7,660,704 B2 | 2/2010 | Shiga | |
| 8,213,702 B2 | 7/2012 | Yang | |
| 2004/0225474 A1 | 11/2004 | Goldfine et al. | |
| 2006/0062650 A1 | 3/2006 | Keener | |
| 2008/0183795 A1* | 7/2008 | Long | H04L 67/325 |
| | | | 709/201 |
| 2009/0091144 A1 | 4/2009 | Debrody et al. | |
| 2013/0014368 A1 | 1/2013 | Woods et al. | |
| 2014/0132761 A1* | 5/2014 | Shih | H04N 7/18 |
| | | | 348/142 |

OTHER PUBLICATIONS

International Search Report and Written Opinion issued Oct. 8, 2015, for International Patent Application No. PCT/US2015/040550, filed Jul. 15, 2015, 6 pages.

\* cited by examiner

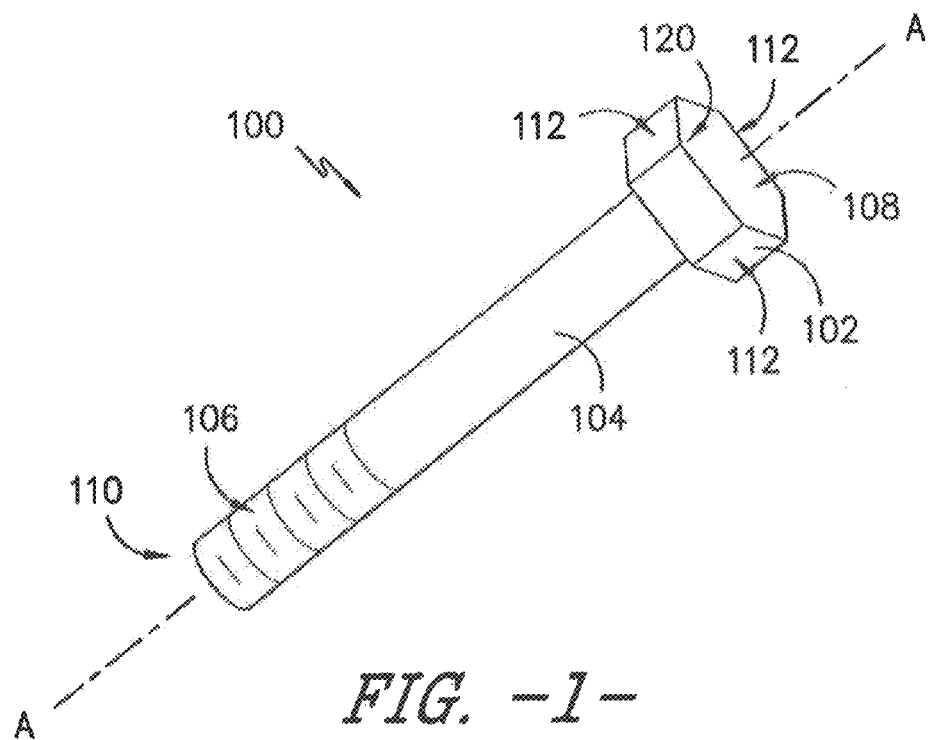
FIG. -1-
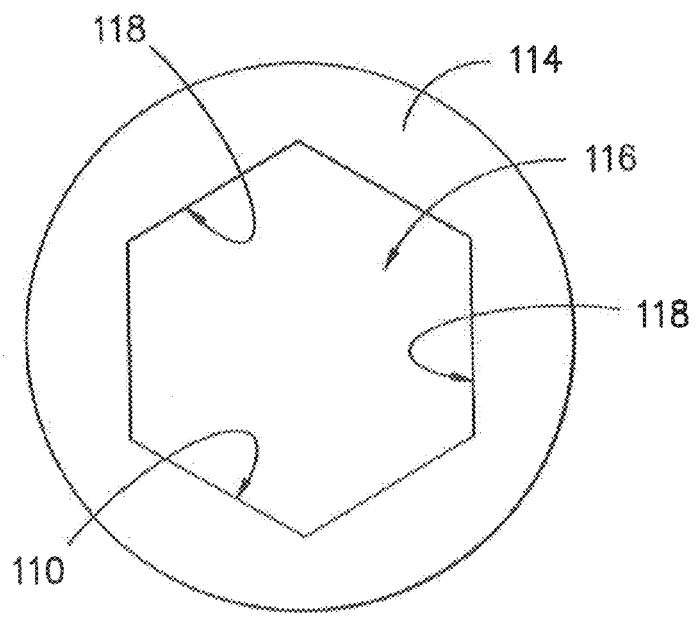
FIG. -2-

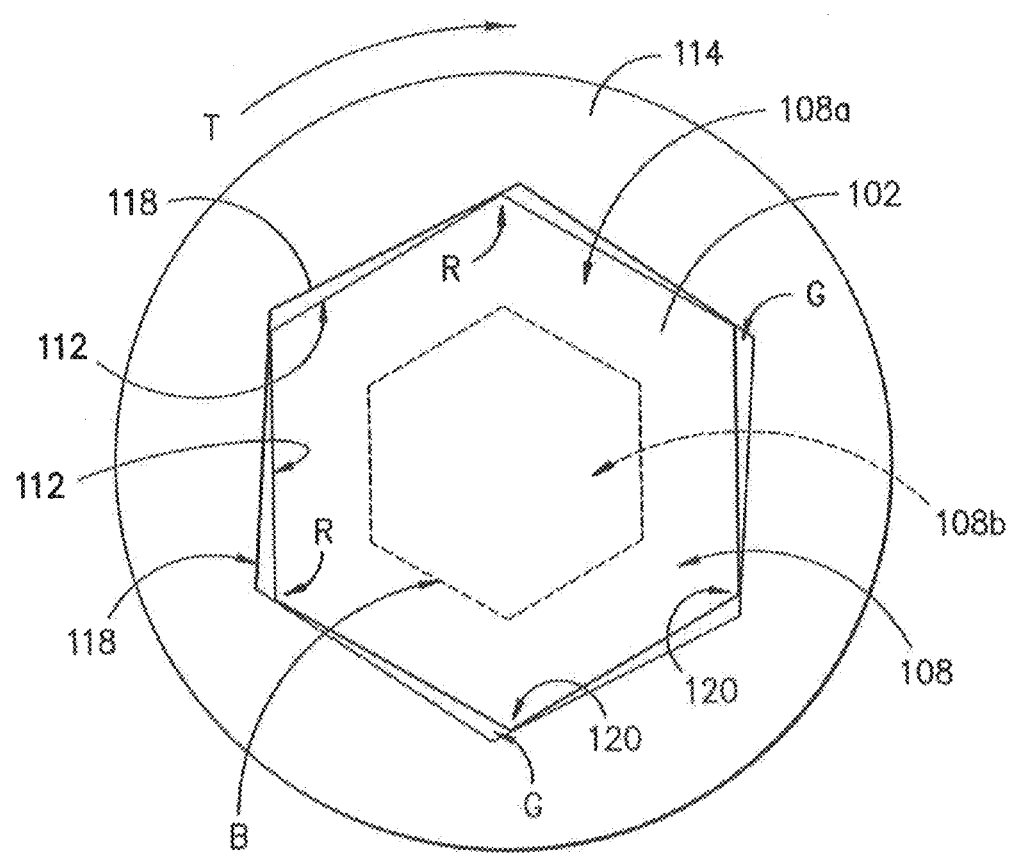
FIG. -3-

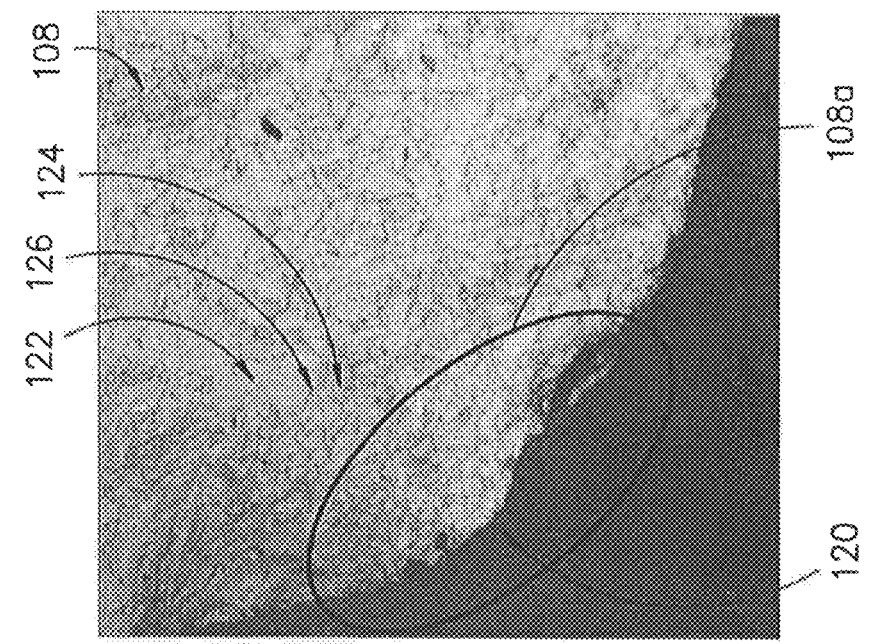
FIG. -4B-
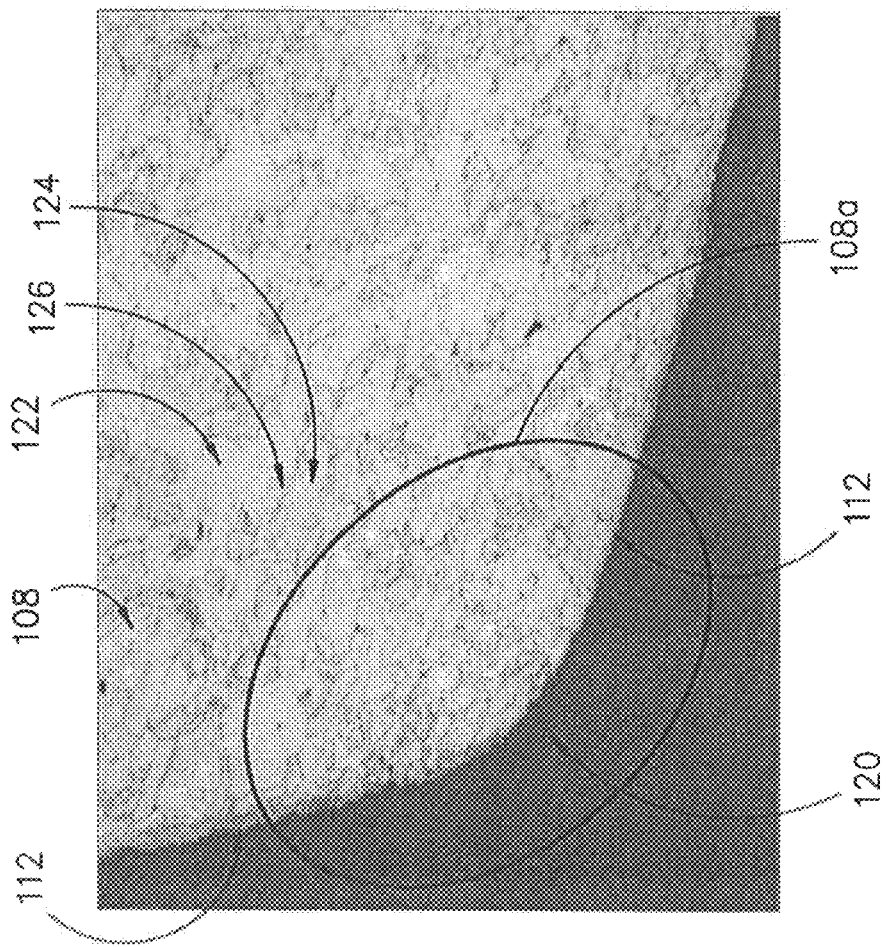
FIG. -4A-

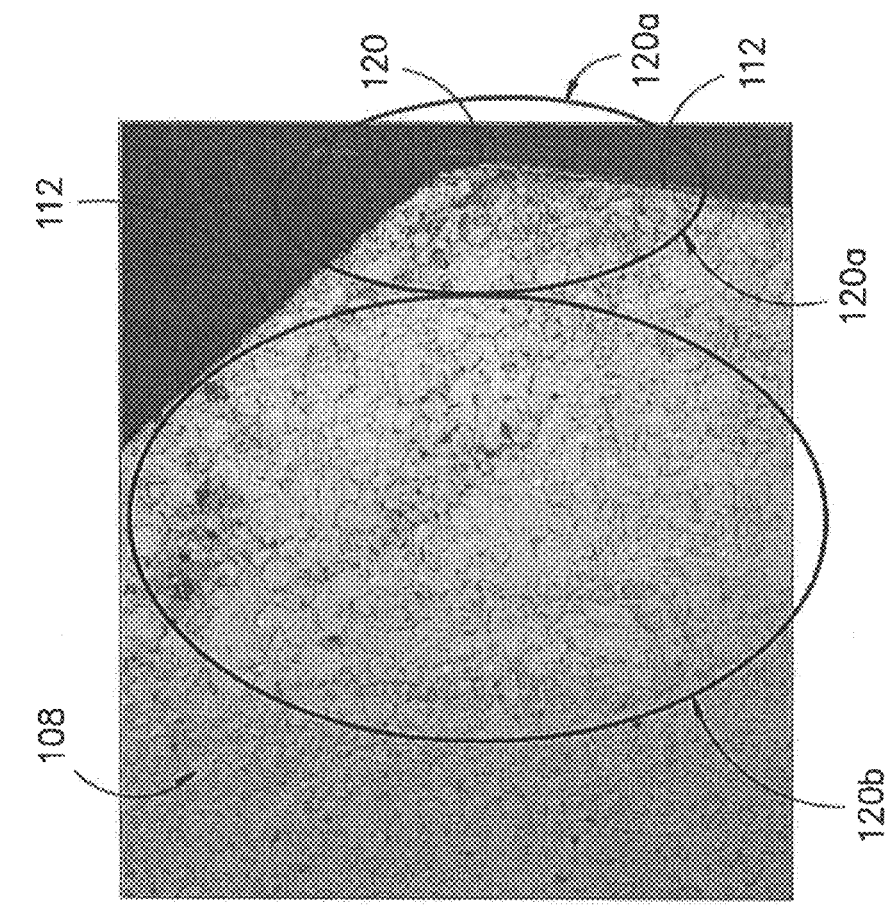
FIG. -5B-
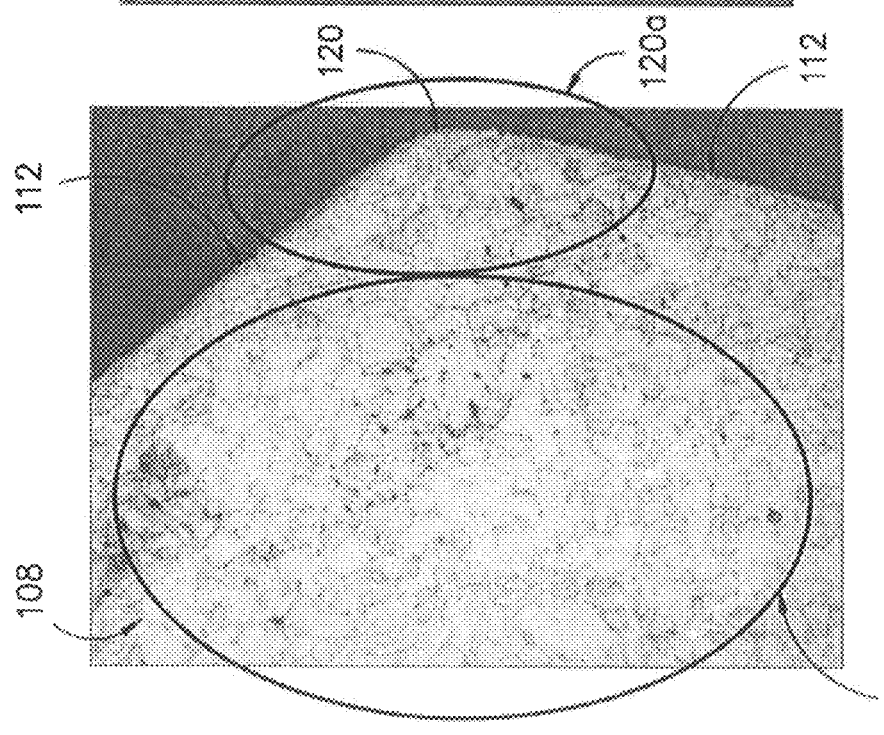
FIG. -5A-

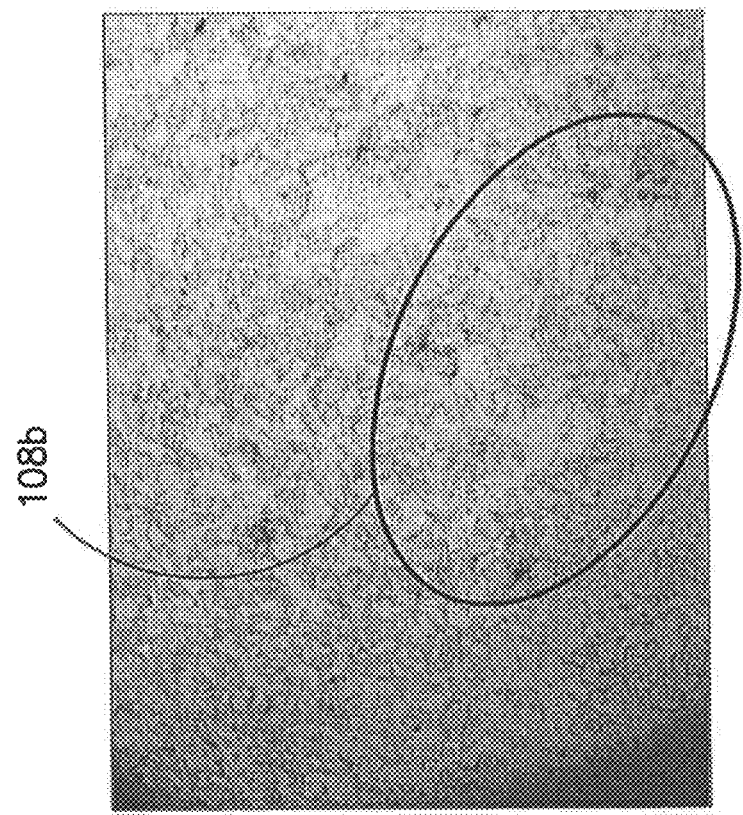
FIG. -6B-
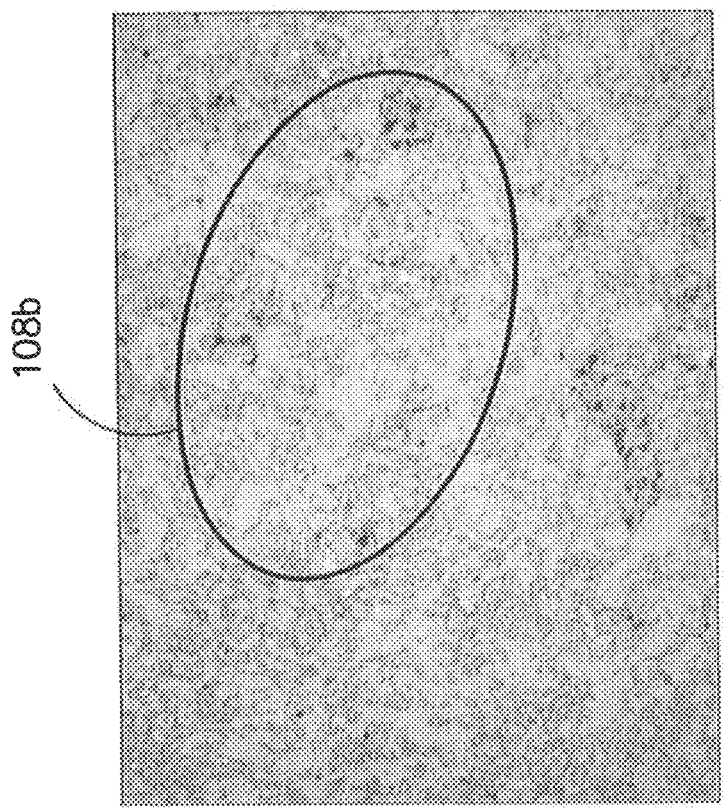
FIG. -6A-

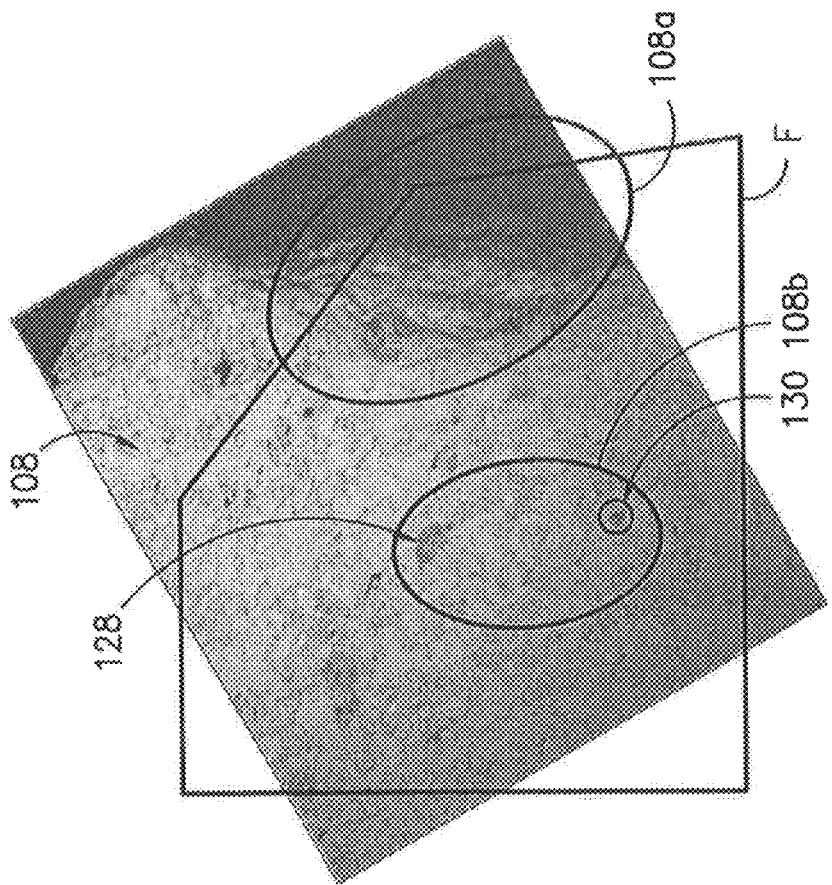
FIG. -7B-
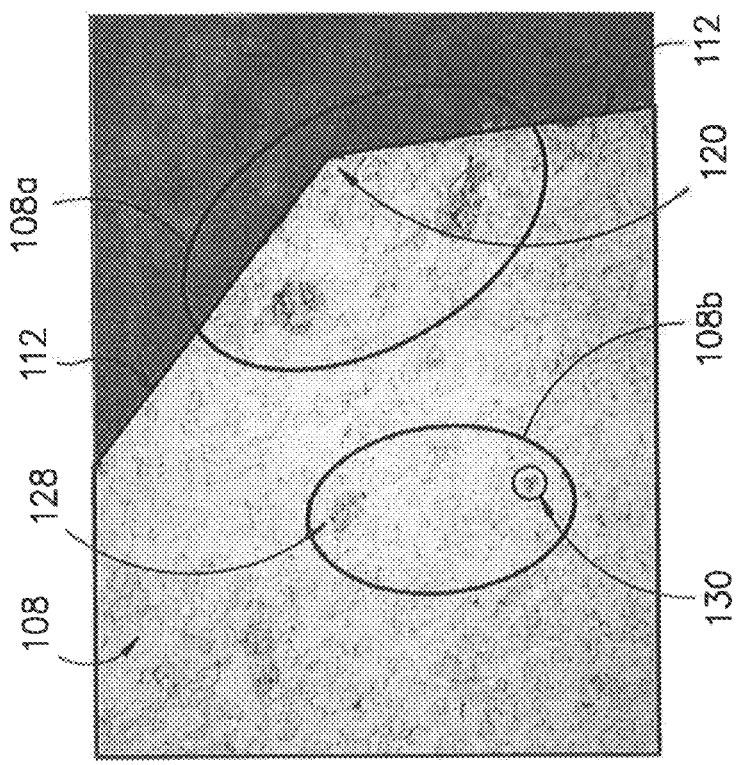
FIG. -7A-

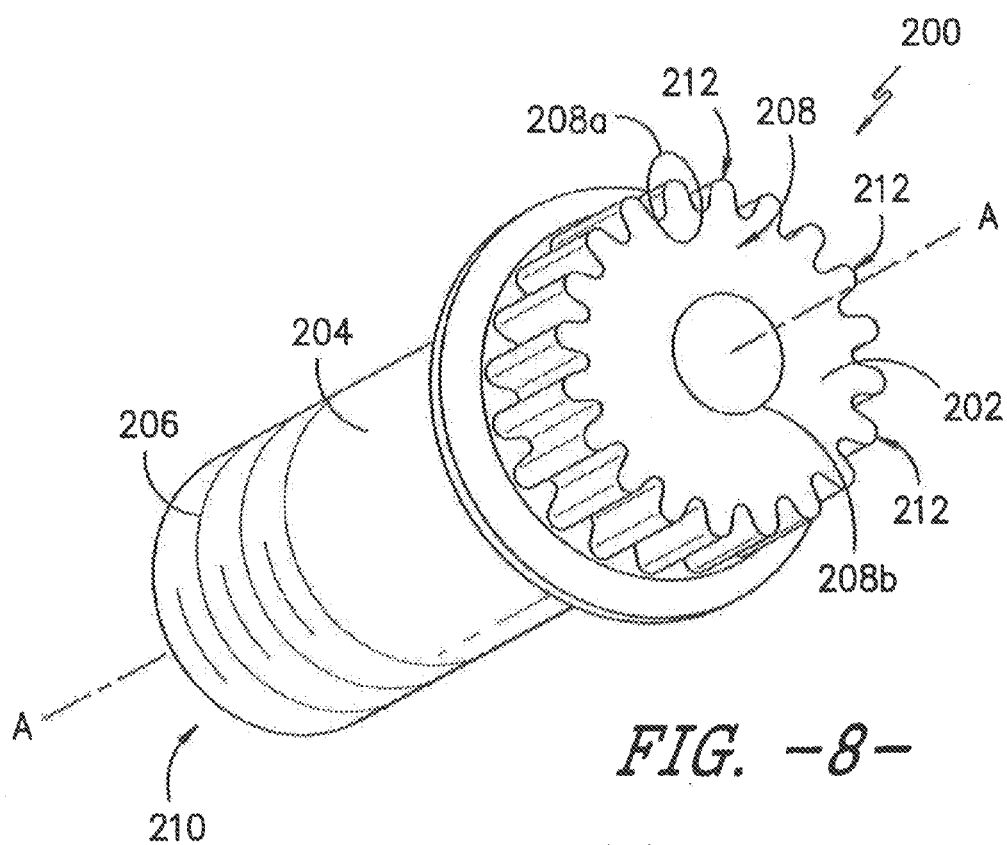
FIG. -8-
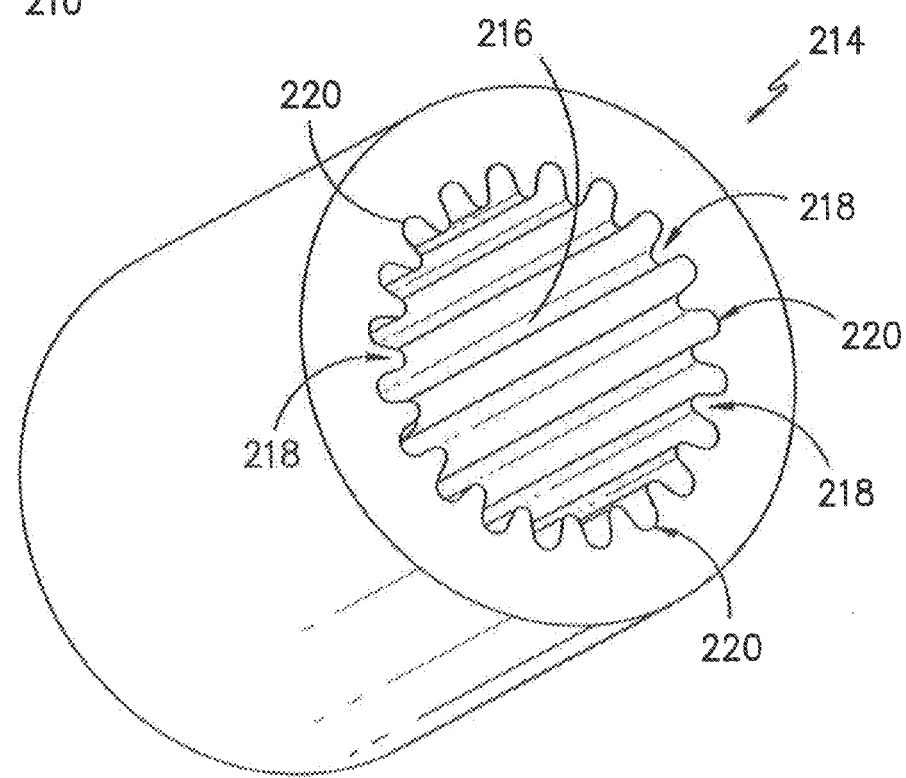
FIG. -9-

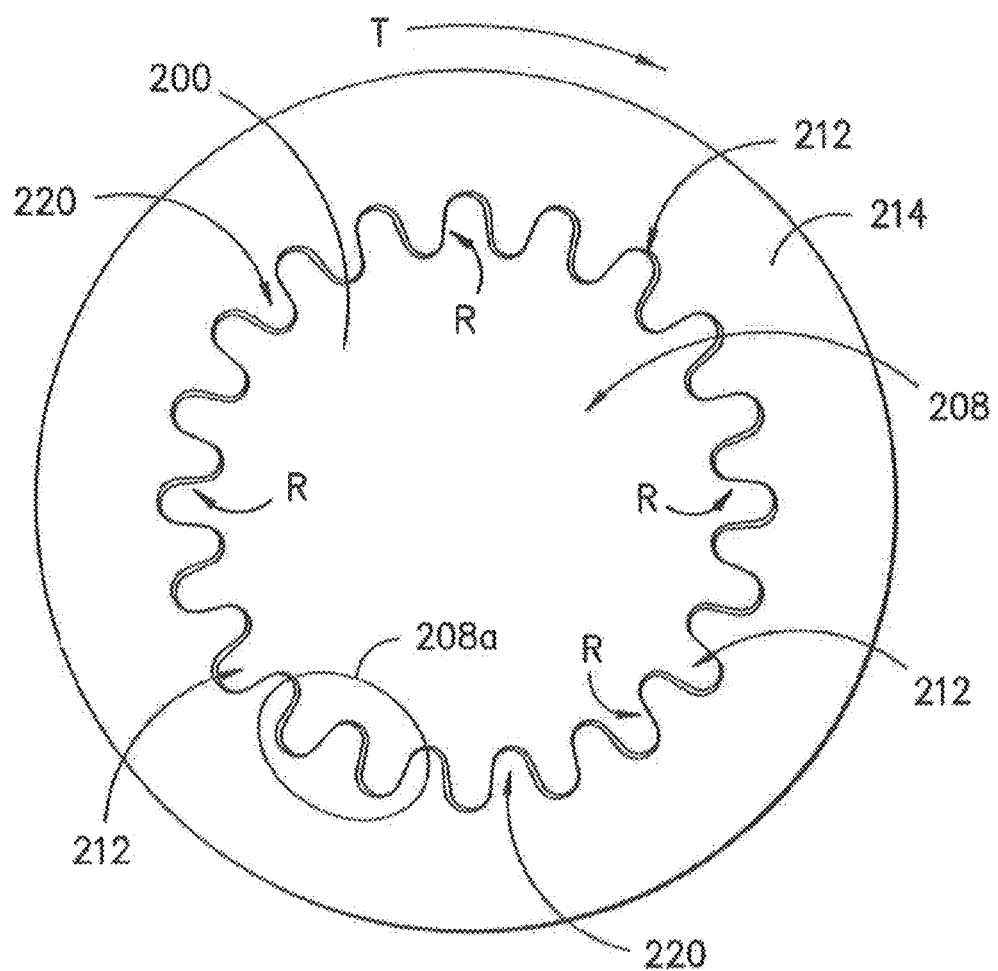
FIG. -10-

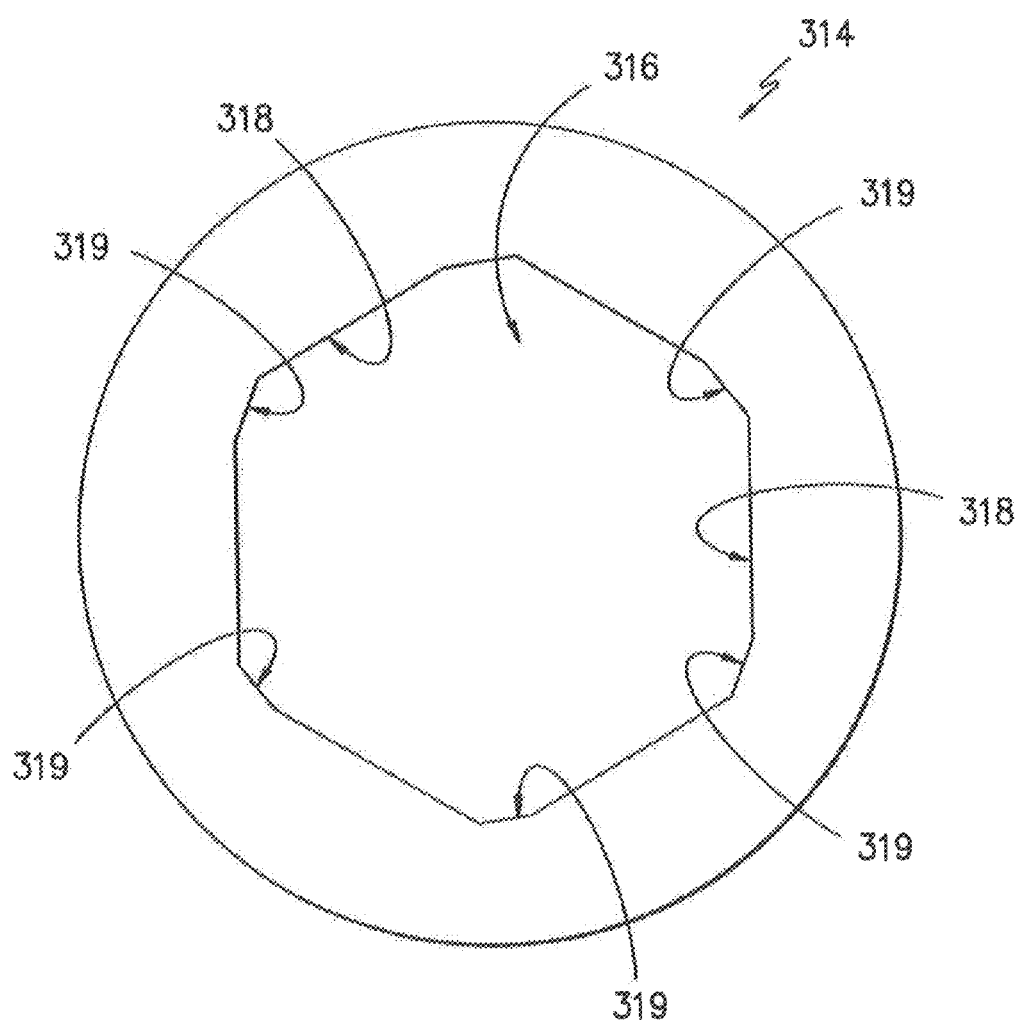
FIG. -11-

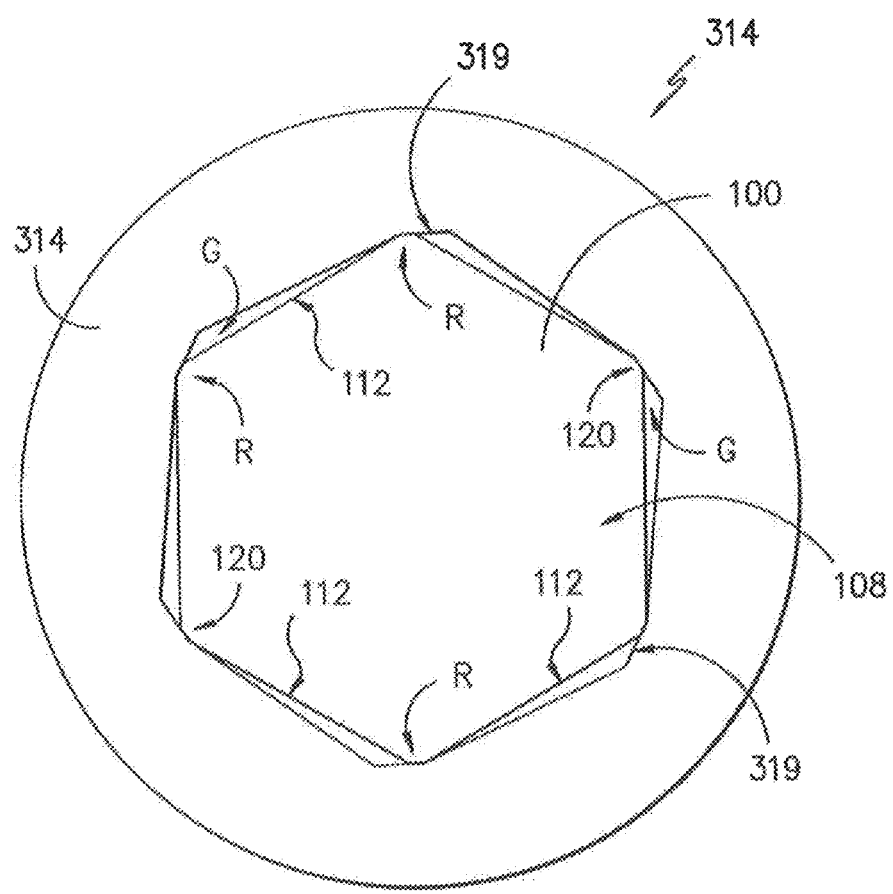
FIG. -12-

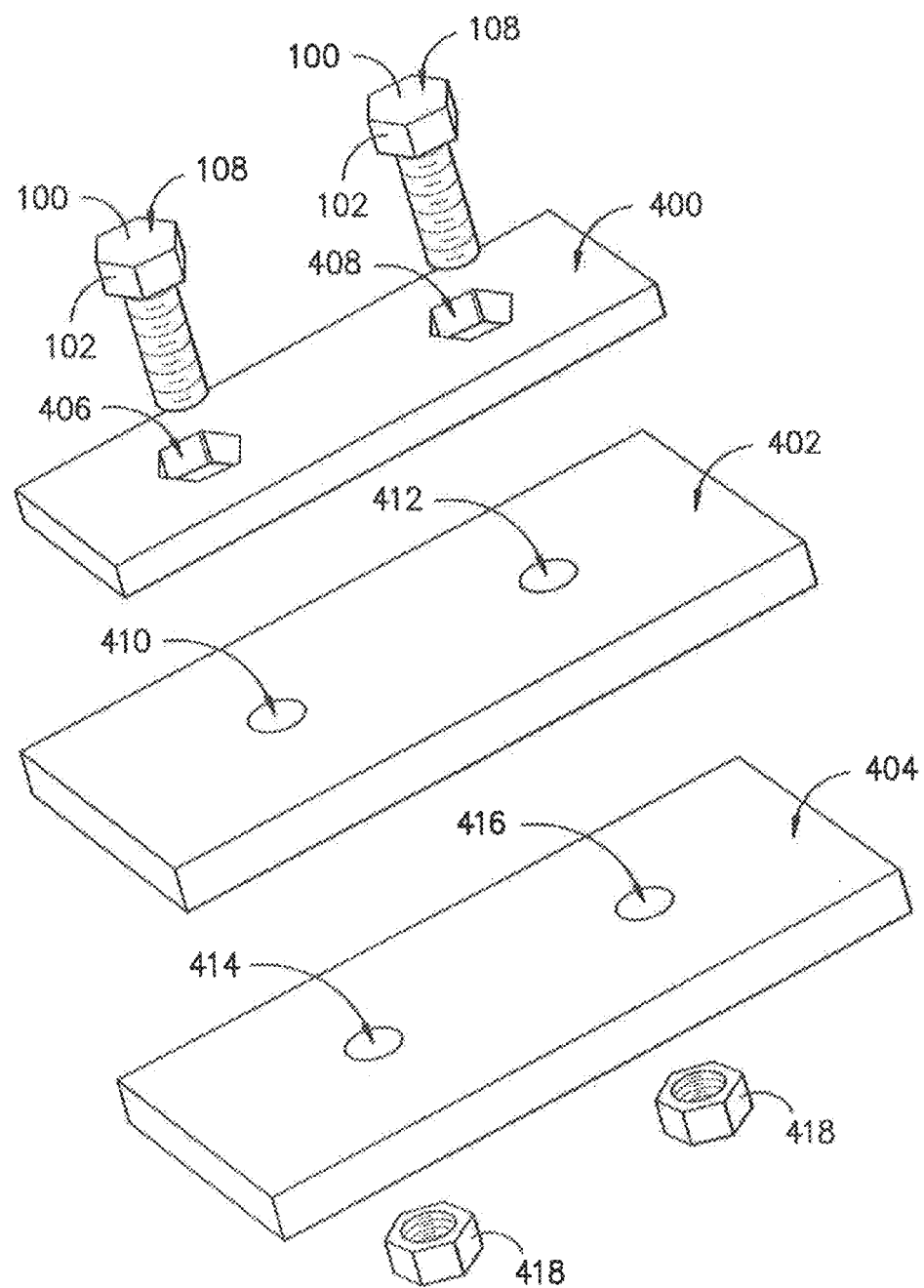
FIG. -13-

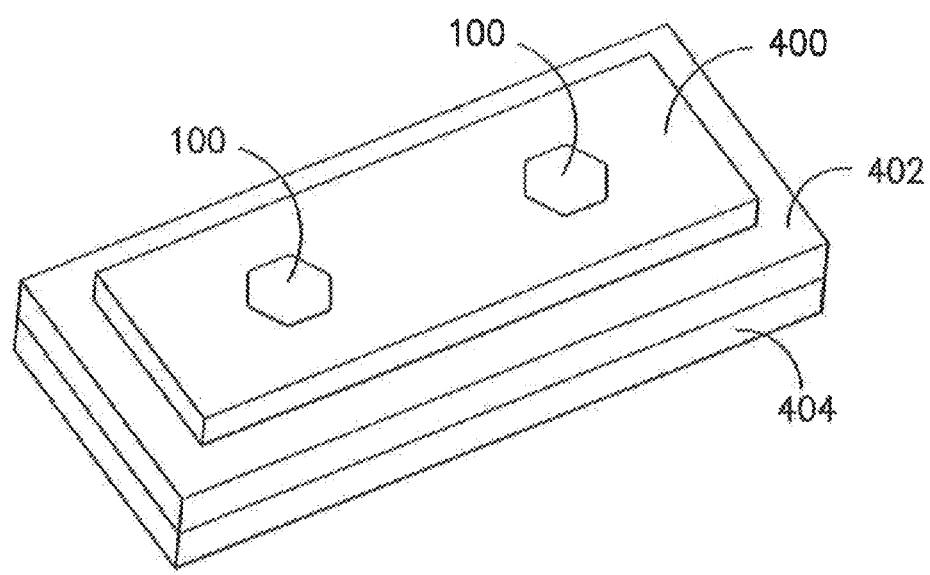
FIG. -14-
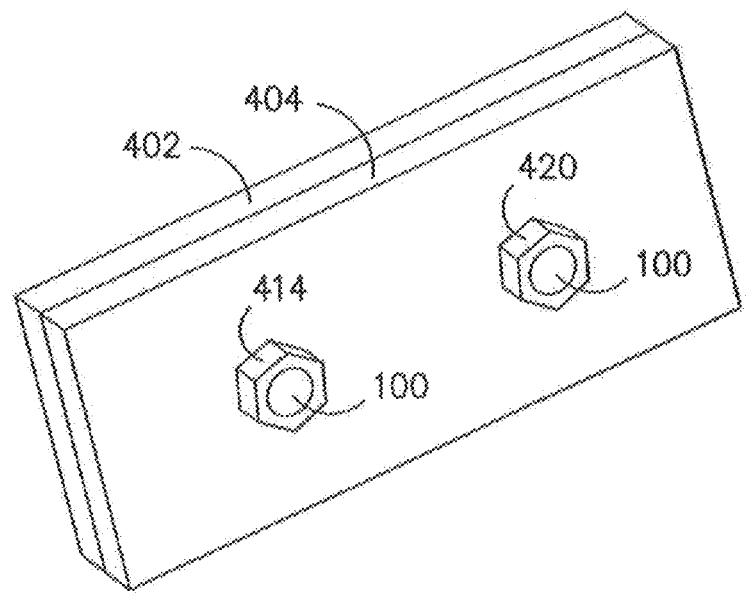
FIG. -15-

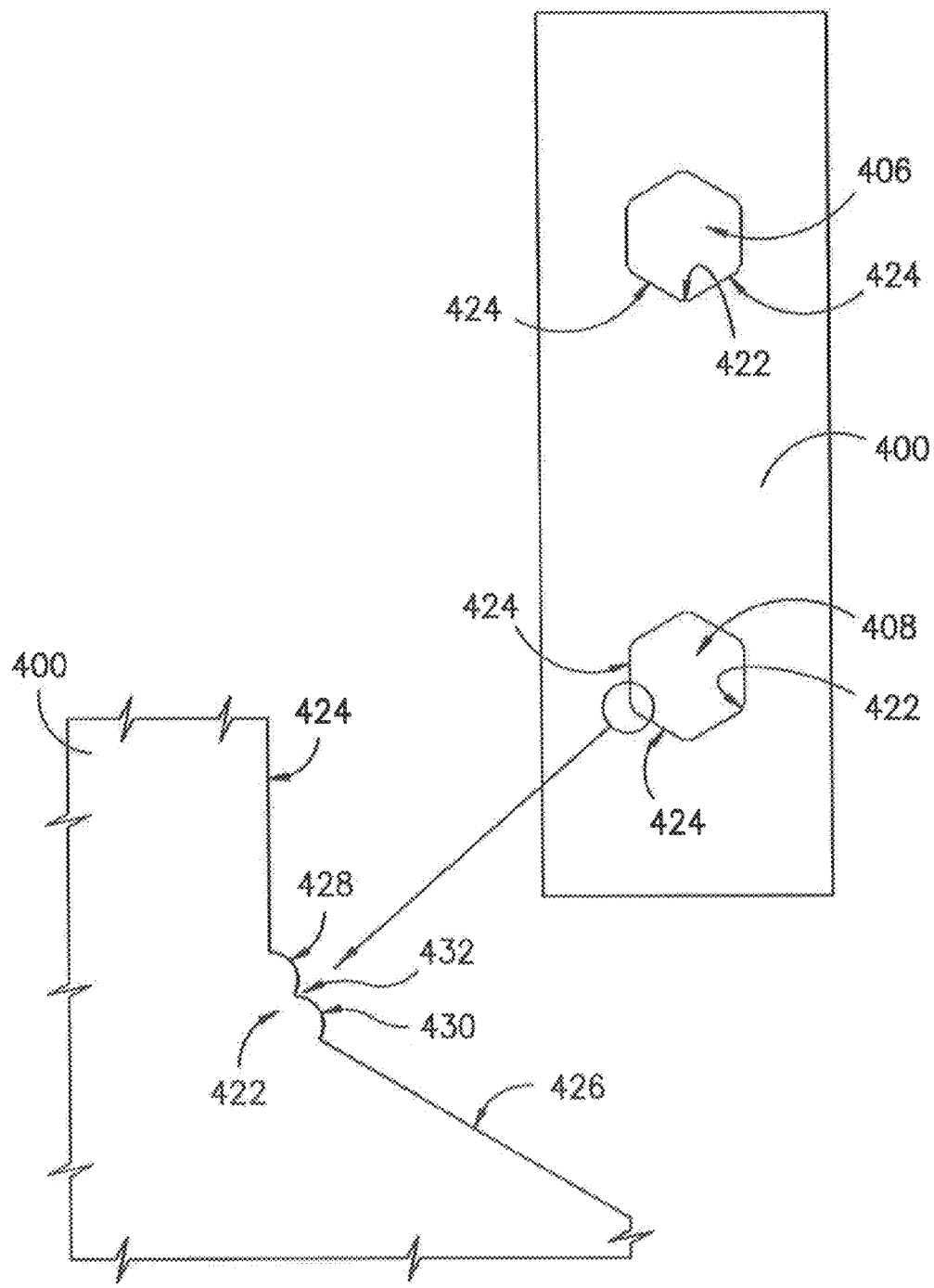
FIG. -16-

SYSTEM FOR TAMPER IDENTIFICATION

CROSS-REFERENCE TO RELATED APPLICATIONS

This application is based upon and claims priority to U.S. Provisional Patent Application No. 62/024,602, filed on Jul. 15, 2014, which is hereby incorporated by reference herein in its entirety for all purposes.

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The subject matter of the present disclosure relates generally to a system for tamper identification.

BACKGROUND OF THE INVENTION

In the storage and transport of certain items, the ability to detect tampering with a container or compartment for such items can be necessary and valuable. For example, a retailer shipping inventory may need to know whether tampering with the container has occurred during transport. Such information can reveal whether the shipment is original and complete, and can aid in determining when tampering occurred. Similarly, in the transport of hazardous substances, the transporter and/or recipient may desire a method of ensuring that container tampering has not occurred. The transport and storage of nuclear materials including fuels and/or radioactive waste is subject to particularly stringent requirements to ensure integrity as well as safe transport and storage of the materials.

The ability to detect tampering with other devices could be useful as well. For example, knowing whether an attempt has been made to remove an item such as e.g., a security camera mounted to a wall could also be useful.

Accordingly, a system for determining whether tampering with a container, compartment, or other item has occurred would be useful and beneficial.

BRIEF DESCRIPTION OF THE INVENTION

The present invention provides a system for tamper identification. At least one fastener is used to seal a compartment or container, or to secure a device. The fastener has a tamper identification surface with a unique grain structure that is altered if the fastener is removed or otherwise exposed to sufficient torque. After shipment and/or storage of the sealed container, a determination of whether tampering has occurred can be undertaken by examining the grain structure to determine if it has changed since the fastener was used to seal the container. In the case of a device attached or secured using the fastener, the grain structure can be examined after a period of time to determine if there has been an attempt to remove the device. Tools and other components specifically designed to alter the grain structure of the tamper identification surface may be employed. A variety of fastener types may be used, and the fastener may be configured with one or more materials more susceptible to alteration of the grain structure along the tamper identification surface so as to enhance the ability to determine tampering. Authentication of the fastener is also provided. Additional aspects and advantages of the invention will be set forth in part in the following description, or may be apparent from the description, or may be learned through practice of the invention.

In one exemplary aspect, the present invention provides a method of tamper identification. This exemplary method includes the steps of applying torque to a fastener used to seal a compartment or secure a device, the fastener having a tamper identification surface comprising a first portion and a second portion, the fastener having a unique grain structure along the tamper identification surface; creating a reference image of the tamper identification surface of the fastener after the step of applying, the reference image comprising grain structure of the first portion that was altered; obtaining a verification image of the tamper identification surface after the step of creating, the verification image comprising grain structure of the first portion; and determining whether there are differences in grain structure between the reference image and verification image along the first portion that are indicative of tampering.

The present invention also includes one or more tools specially designed for distorting the grain structure of the tamper indicating surface. The present invention also includes fasteners specially designed to undergo alteration of the grain structure along the tampering indicating surface upon application of sufficient torque.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of an exemplary embodiment of a fastener as may be used with the present invention.

FIG. 2 is a top view of an exemplary tool for use with the exemplary fastener of FIG. 1.

FIG. 3 is a top view illustrating the application of the exemplary tool of FIG. 2 to the exemplary fastener of FIG. 1.

FIGS. 4A, 4B, 5A, 5B, 6A, 6B, 7A, and 7B are photographs of magnified images depicting the grain structure along a tamper indication surface of various exemplary fasteners as more fully described herein.

FIG. 8 is a perspective view of another exemplary fastener of the present invention.

FIG. 9 provides a perspective view of another exemplary tool as may be used with the present invention.

FIG. 10 is a top view of the exemplary fastener of FIG. 8 received within the exemplary tool of FIG. 9.

FIG. 11 is a top view of another exemplary tool of the present invention.

FIG. 12 is a top view illustrating the application of the exemplary tool of FIG. 11 to an exemplary fastener.

FIG. 13 is an exploded perspective view of an exemplary fastening system of the present invention.

FIG. 14 is a perspective of the exemplary fastening system of FIG. 13.

FIG. 15 is another perspective of the exemplary fastening system of FIG. 13.

FIG. 16 includes a close-up view of a portion of one of the components of an exemplary fastening system such as the tool shown in FIG. 2 or a component of FIG. 13.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of an exemplary fastener 100 of the present invention. For this embodiment, fastener 100 is provided as a bolt with a hexagonally-shaped head 102 connected to a shall 104. Threads 106 are positioned at a distal end 110 and help secure the position of fastener 100 into a complementary opening of a compartment (not shown) or device for which it is desirable to determine if tampering has occurred. "Container" and "compartment" are used herein interchangeably. The opening would have complementary threads configured for engaging fastener 100 as it is rotated about axis A-A in the opening under application of torque. The fastener 100 could be inserted into the opening to e.g., attach a door or cover, or to otherwise provide for sealing the container. The container could be used to store and/or transport e.g., inventory, hazardous materials, as well as other items.

As used herein, "tampering" includes improper access—as well as improper attempts to gain access—to the container or compartment. Tampering also includes improper attempts to remove an item or device such as e.g., an attempt to remove a security camera from a wall. The present invention can be applied to both situations. In the discussion that follows, an example used to detect container tampering will be provided by way of explanation, but not limitation, of the invention. Using the teachings disclosed herein, one of skill in the art will understand that the same inventive techniques can be applied to determine whether tampering has occurred with a fastener used to secure a device.

As used herein, "seal" or "sealing" does not necessarily require a weatherproof or air-tight interface and, instead, refers to closing a compartment or container for which protection against tampering is desired. Fastener 100 may not be the only fastener used to seal such compartment and, instead, may be one of several used to seal a container or compartment by securing a door, latch, or other device. One or more of such fasteners may be used for tamper identification. A variety of configurations for sealing may be used. In each example, one or more fasteners 100 are employed in a manner that requires removal of at least one fastener 100 by application of torque before the contents to the container can be accessed without otherwise damaging the container.

Fastener 100 is constructed from a material, e.g., one or more metals, that will exhibit a unique grain structure along a tamper indicating surface 108. Such grain structure results from boundaries formed between individual grains of the crystalline material and is common to metals. This grain structure can usually be readily viewed under magnification after etching, which will preferentially attack the grain boundaries to more clearly reveal the grains. It may also be necessary to polish tamper indicating surface 108 before etching to facilitate observation of the grain structure.

FIG. 2 provides an end view of a tool or socket 114 having an opening 116 configured for complementary receipt of head 102 as shown in FIG. 3 Socket 114 has a plurality of interior contact surfaces 118 arranged for contact with the faces 112 of fastener 100. In sealing a container, socket 114 is used to apply a torque (arrow T in FIG. 3) to fastener 100, rotating it about axis A-A until it is secured in an opening as will be understood by one of skill in the art. Contact between surfaces 118 and faces 112 causes fastener 100 to rotate and threads 106 will be engaged with complementary threads in the opening defined by the container or other device to be sealed. The present invention is not limited to socket 114 and may be used with other tools as well. For example, the tool could be a closed or open end wrench.

In FIG. 3, a slight gap G is shown between each interior contact surface 118 and face 112. For purposes of describing the invention, the size of gap G may be shown larger than actual size. As socket 114 applies a torque to fastener 100 in order to seal a compartment, localized contact regions R will occur along each face 112 where surfaces 118 contact faces 112. When sufficient torque is applied, the grain structure as viewed along tamper indicating surface 108 will be altered or changed—particularly near the contact regions R. Notably, for this particular fastener 100, contact region R occurs at the apex or intersection 120 of adjacent faces 112.

Tamper indicating surface 108 can be divided between a first portion 108a and a second portion 108b as shown by dashed line B. First portion 108a includes a portion of tamper indicating surface 108 where its grain structure will be altered on application of sufficient torque by socket 114. For the exemplary embodiment of FIG. 3, first portion 108a includes e.g., at least one contact region R. In sealing a container, fastener 100 is installed with enough torque to ensure that removal of fastener 100 will alter the grain structure of one or more first portions 108a of surface 108.

Conversely, second portion 108b represents a portion of tamper indicating surface 108 least likely to undergo distortion of the grain structure upon application of a torque to fastener 100 in sealing a compartment. By way of example, for this exemplary embodiment of fastener 100, second portion 108b intersects the axis of rotation A-A of fastener 100 where the experienced torque will be minimal such that contact by socket 114 with head 102 is unlikely to otherwise alter the grain structure. Provided for purposes of explanation only, boundary line B in FIG. 3 represents an arbitrary division between portions 108a and 108b—other selections for portions 108a and 108b could also be made as will be understood using the teachings disclosed herein. For example, second portion 108b may be located much closer to contact regions R depending upon e.g., the amount of torque applied, the hardness of the material used for head 102, and other factors as will be understood by one of skill in the art from present disclosure including the examples that follow.

After at least one fastener 100 is used to seal a container, at least one reference image of tamper indicating surface 108 is created. The reference image may include the entirety of surface 108, only first portion 108a, or only parts of first portion 108a such as e.g., only one of the particular contact regions R where altering of the grain structure will occur if fastener 100 is removed. Regardless, the reference image should include at least one location in first portion 108a of surface 108 where the grain structure will be distorted if fastener 100 is removed. For the exemplary fastener 100 shown in FIGS. 1 and 3, this location will be proximate to contact region R. More than one reference image may be created. For example, separate reference images for one or more of the six contact regions R could be employed.

The reference image should be taken at a sufficient level of magnification so that the grain structure of tamper indicating surface 108—particularly in first portion 108a—is discernible. As previously indicated, it may be necessary to polish surface 108 and/or etch surface 108 before the reference image is created. In one exemplary aspect, the reference image can be created using 50× or 100× magnification and a high definition camera. Other levels of magnification and equipment may be used as well provided the grain structure is visible and can be captured—particularly at the boundaries between grains where alteration will occur in first portion 108a. Preferably, the reference image is stored for later retrieval. The reference image may also be encrypted or otherwise protected from tampering. A decryption algorithm can be used for subsequent access. Multiple copies may also be created for additional security.

In order to protect the grain structure on tamper indicating surface 108, a protective coating or layer can be applied to tamper indicating surface 108. Depending upon e.g., the length of time fastener 100 will be in service, the environment of use, and other facts, a protective layer could be necessary to preserve the grain structure as its appears in the reference image of first portion 108a. Unless the protective layer is clear, it should be removable to allow access for purposes of tamper identification. For example, a layer of wax or a removable elastomer can be used to protect tamper indicating surface 108. Where there is reason to believe surface 108 might be impacted during storage or transport, a protective cage or box might also be installed over tamper indicating surface 108.

Once fastener 100 has been used to seal a container and at least one reference image containing first portion 108a has been captured, at a subsequent time it may be desirable to determine if tampering has occurred. Specifically, it may be desirable to know whether the container has been opened or whether an attempt was made to open the container after a period of storage and/or shipping. A tampering attempt may be blatantly obvious where e.g., structural damage to the container has occurred by cutting or otherwise destroying the container. However, other tampering events may be less apparent but no less important to detect. For example, the culprit may attempt to open the container in a manner that conceals the fact that tampering has occurred. In such case, the culprit is likely to attempt opening the container the same way it was sealed, which should include removal of fastener 100 for access to the contents of the container. The culprit may even reinstall fastener 100 or a fastener having a similar appearance in an effort to hide the tampering. Preferably, the container is designed to require removal of fastener 100 if the container is to be unsealed without damage. The present invention provides a system by which such tampering—even the less apparent form—can be detected.

Accordingly, in order to determine whether tampering has occurred, at least one verification image of the tamper indicating surface 108 is obtained. Such verification image could be taken using e.g., the same equipment used for the reference image. The verification image should include at least part of the first portion 108a of tamper indicating surface 108 that was included in the reference image. More specifically, the verification image should include at least a part of first portion 108a where alteration of the grain structure would occur if a torque has been applied to remove fastener 100. For the exemplary embodiment of FIG. 3, this would again include at least one of the contact regions R. However, the verification image may include all of tamper indicating surface 108 or addition portions thereof as well. As with the reference image, multiple verification images may be obtained.

Additionally, such verification image of the first portion 108a should be obtained before a torque is applied to fastener 100 in order to remove it from the container. If a protective layer was applied as previously described, it may be necessary to remove the layer before obtaining the verification image.

By careful inspection and comparison of the first portion 108a between at least one reference image and at least one verification image, a determination can be made as to whether tampering has occurred. More particularly, the grain structure of the first portion 108a as shown in the reference image is compared with this same location in the verification image to determine if there are differences in grain structure. This comparison can be performed e.g., visually by comparison of the images or may be assisted/automated by image recognition equipment. If the grain structure is unchanged, then fastener 100 was not removed from the container.

Alternatively, if the grain structure is different, then a torque has been applied to fastener 100 indicative of tampering. The change in grain structure provides evidence that fastener 100 was either removed from the container or at least an attempt was made to remove it. In either case, such is indicative of tampering during the period of storage and/or transport.

FIGS. 4A and 4B provide photographs of the tamper indicating surface 108 of an exemplary fastener 100. These photographs, as well as the one depicted in FIGS. 5A, 5B, 6A, 6B, 7A, and 7B, were taken with a Riechert-Jung microscope at levels of magnification including 50× and 100× and photographed with a Diagnostic Instruments camera. At these magnification levels, individual grains such as e.g., grains 122 and 124 are readily identifiable with boundaries 126 therebetween. As previously stated, etching may be required before boundaries 126 are discernible.

FIG. 4A represents the reference image while FIG. 4B represents the verification image for this particular example. For each image, the same part of first portion 108a—i.e. the same apex 120 is depicted. As a comparison of the images readily reveals, the grain structure visible on first portion 108a has changed at some time between the creation of the images. Further, even if the grain structure change was not apparent, the shape of lower face 112 has been altered. Accordingly, these changes indicate that a tool has used to apply a torque to fastener 100 at some time between the creation of the reference image and the verification image. Additionally, if a sufficient level of torque is applied, some changes such as e.g., a change to the shape of face 112, may be visually apparent without magnification.

FIGS. 5A and 5B provide another example of a tamper indicating surface 108 in which FIG. 5A is the reference image and FIG. 5B is the verification image. For this example, the shape of lower face 112 does not appear to have changed significantly and remains basically linear in both images. However, changes in the grain structure of first portion 108a are readily apparent. Notably, these changes appear near apex 120 in contact region R, where surface 118 of socket 114 would make contact with head 102 of fastener 100. Accordingly, a torque has been applied to fastener 100 at some time between the creation of the reference image and the verification image, which is indicative of tampering. Also, FIGS. 5A and 5B show that changes to grain structure may be detectable even at an amount of torque that would not be sufficient to alter face 112 as occurred in the example of FIG. 4B.

The use of a reticle in the viewing and magnification instrument can assist with determining changes in the grain structure between the reference image and the verification image. For example, by equipping the microscope with a reticle, the shape and location where one or more grains and/or grain boundaries intersect the reticle can be compared between the reference image and verification image. Of course, the reticle should have the same orientation relative to the tamper indicating surface when comparing the reference image and the verification image. Where comparison of images is performed using e.g., a computer and image recognition software, the use of a reticle as described can reduce the amount of computing power required.

The present invention also allows for authentication of fastener 100. As used herein, authentication refers to confirming whether the same fastener 100 appears in the reference image and the verification image. For example, referring to FIGS. 5A and 5B, each image includes a second portion 108b on tamper indicating surface 108. Even though the grain structure in first portion 108a has changed between these images, the grain structure in second portion 108b is substantially unchanged. Because grain structure will be unique for each fastener 100, an examination of second portion 108b authenticates fastener 100—i.e. confirms that the same fastener 100 was examined in both the reference image and the verification image.

Authentication can be important in preventing a false conclusion of tampering. For example, if a different fastener was used for the verification image than the reference image, one might incorrectly conclude that the difference in grain structure was due to the application of a torque. However, such difference could be the result of the fastener being completely replaced, which would indicate tampering has occurred.

Authentication does not necessarily require the creation of additional images. For example, the reference image and the verification image could each include first and second portions 108a and 108b so that more than two images are not required for authentication during a tampering determination. Alternatively, separate images could be used for each of the different portions 108a and 108b with separate comparisons for authentication and tamper identification.

For the images shown in FIGS. 5A and 5B, second portion 108b is located relatively near first portion 108a. However, depending upon the amount of torque applied, more separation between portions 108a and 108b may be required. Referring back to FIG. 1, fastener 100 rotates around axis A-A upon application of a torque. Accordingly, portions of tamper indicating surface 108 nearest to the axis A-A will experience less torque than portions near faces 112.

For example, FIG. 6A is a reference image taken near axis A-A of fastener 100 before application of a torque while FIG. 6B represents a verification image taken at the same location near axis A-A. As a close comparison reveals, the grain structure in portion 108b of the images appears virtually identical. Accordingly, using a second portion 108b that is intersected by axis A-A of fastener 100 can be useful for authentication.

FIGS. 7A and 7B provide another example of a reference image and verification image, respectively, of a tamper indication surface 108. Frame F in FIG. 7B depicts the original location of faces 112. As shown, clearly a torque has been applied to fastener 100 as evidenced by the modification of faces 112. Additionally, the grain structure in first portion 108a, which includes the original apex 120, has changed. At the same time, reference grains 128 and 130 in second portion 108b remain largely unchanged and, therefore, can be used for authentication of fastener 100.

In addition or as alternatives to those just described, other methods of authentication may be used. For example, an identification tag could be used in the form of a unique identifier or serial number engraved onto fastener 100 along tamper indicating surface 108 or a face 112. The identifier or serial number could also be encrypted.

In still another example of authentication, the protective layer previously described could be formed from a clear substance containing multiple particles of unique shapes and/or orientation. An image of these particles could be recorded and later used for authentication of fastener 100. An identification tag could also be attached to fastener 100.

In another exemplary aspect of authentication, an image of a side view of fastener 100 (i.e. perpendicular to axis A-A) could also be used for authentication. When a sufficient torque is applied to fastener 100, deformation of head 102 can occur three dimensionally. For example, movement of tamper indicating surface along axis A-A in a direction away from distal end 110 can occur to provide a unique profile of fastener 100. By recording an authentication image of this profile, fastener 100 can be authenticated later by comparison with such image.

While these examples may not provide for authentication that is as secure as the use of the grain structure in second portion 108b, such examples may be acceptable where less stringent measures are acceptable. Alternatively, these less stringent examples of authentication could serve as additional or preliminary steps in an authentication process that also relies on images of the grain structure in second portion 108b.

The present invention is not limited to a particular fastener type and other examples may be used as well. FIGS. 8, 9, and 10 illustrate a spline fastener 200 and spline drive socket 214 for applying a torque to fastener 200. Fastener 200 is constructed from one or more metals and includes a plurality of splines 212 positioned on head 202, which is connected to shaft 204. Each spline 212 extends longitudinally along axis A-A of fastener 200. A plurality of threads 206 are positioned at distal end 210 and are configured for securing fastener 200 into an opening of a container or compartment as previously described for fastener 100. Head 102 includes a tamper indicating surface 208.

Socket 214 includes an opening 216 for receipt of spline fastener 200 as shown in FIG. 10. A plurality of splines 218 surround opening 216 and form grooves 220 into which splines 212 are received in complementary fashion. Accordingly, when socket 214 is engaged with head 202 of fastener 200, the application of a torque T by rotation of socket 214 will create localized contact regions R at each spline 212 as shown in FIG. 10. As with fastener 100, the grain structure of tamper indication surface 208 at contact regions R will be altered upon application of a sufficient torque. Accordingly, tamper indication surface 208 can provide one or more first portions 208a from which reference and verification images may be obtained for use as previously described with fastener 100. Similarly, tamper indication surface 208 provides a second portion 208b (FIG. 8) from with an image may be obtained for authenticating fastener 200 as previously described with fastener 100.

In order to facilitate grain alteration under application of a torque, the present invention also includes fasteners where one or more components may be manufactured using a material more susceptible to grain alteration. For example, referring to fastener 200, splines 212 could be manufactured from a different metal that is softer than the rest of head 202 and thus one that is more likely show grain alteration along surface 208 under application of a torque. Alternatively, the entire head 202 could be constructed from a different metal than e.g., shaft 204 for the same purpose. Other constructions to facilitate grain alteration along the tamper indicating surface of a fastener due to application of a torque may be used as well.

The present invention also includes tools having features specifically designed for distorting the grain structure of a tamper indicating surface of a fastener. FIG. 11 and FIG. 12, for example, provide an end view of a socket 314 similar in many respects to socket 114. Between interior faces 318 surrounding recess 316, socket 314 includes a plurality of additional contact surfaces 319. Each surface 319 is configured to create contact regions R by engaging apexes 120 at an angle that is different from adjacent surfaces 318. The different angle for surfaces 319 facilitates alteration of head 102 and the grain structure in contact region R.

By way of example, socket 314 could be used to install fastener 100. Surfaces 319 will provide a larger plastic deformation in contact region R than may result from use of socket 114. This larger deformation will be more likely to undergo an alteration in grain structure during tampering. The present invention is not limited to socket 314. Using the teachings disclosed herein, one of skill in the art will understand that other tools can be provided with features for specifically determining where the contact region R will occur with a particular fastener type.

FIGS. 13, 14, 15, and 16 illustrate another tool for causing an alteration in the grain structure of the tampering indicating surface of a fastener. Plates 402 and 404 represent portions of a container or compartment that will be sealed together. For example, plates 402 and 404 could be a lid and drum flange of a container or a door over an opening of a compartment. Fasteners 100 extend through openings 406 and 408 of an anti-rotation plate 400, openings 410 and 412 of plate 402, and openings 414 and 416 of plate 404. Nuts 418 are assembled with fasteners 100. As indicated above, the level of torque applied during assembly should be such that removal of nuts 418 would alter the grain structure of tamper indicating surfaces 108. The anti-rotation plate can be welded or otherwise affixed to plate 402 and will hold fasteners 100 in place as nuts 418 are tightened. After assembly, one or more verification images of tamper indicating surfaces 108 are obtained and recorded as previously described.

As shown in FIG. 16, openings 406 and 408 are each formed with a plurality of interior contact surfaces 424 joined at an apex 422. At least one apex 422 is provided with protrusions 428 and 430 separated by a groove 432. If one or both of nuts 418 are loosened, protrusions 428 and 430 will ensure that the grain structure of tamper indicating surface 108 is altered to create evidence tampering.

Additionally, images can also be recorded of the grain structure of one or both nuts 418. These images can be referenced later when investing whether tampering has occurred so as to confirm that the nuts 418 are original. If nuts 418 have been cut off and replaced, the new nuts will have a different grain structure as will be apparent by comparing with the reference images of nuts 418.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of tamper identification, comprising:
   applying torque to a fastener used to seal a compartment or secure a device, the fastener having a tamper identification surface comprising a first portion and a second portion, the fastener having a unique grain structure along the tamper identification surface;
   creating a reference image of the tamper identification surface of the fastener after the applying torque, the reference image comprising grain structure of the first portion;
   obtaining a verification image of the tamper identification surface after the step of creating, the verification image comprising grain structure of the first portion; and
   determining whether there are differences in grain structure between the reference image and verification image along the first portion that are indicative of tampering;
   wherein the reference image further comprises grain structure from the second portion, the second portion located on the tamper identification surface where alteration of the second portion is unlikely to occur during application of a torque to the fastener sufficient to remove the fastener.

2. The method of tamper identification as in claim 1, wherein the verification image further comprises grain structure of the second portion, and the method further comprises authenticating the fastener by comparing the verification image of the second portion with the reference image of the second portion to determine if the grain structure is the same.

3. The method of tamper identification as in claim 2, wherein the authenticating comprises: viewing a magnified image of the grain structure of the second portion.

4. The method of tamper identification as in claim 2, wherein the fastener defines an axis of rotation that intersects the second portion and does not intersect the first portion.

5. The method of tamper identification as in claim 1, further comprising polishing the tamper identification surface before creating a reference image.

6. The method of tamper identification as in claim 1, further comprising applying a protective layer to the tamper identification surface of the fastener.

7. The method of tamper identification as in claim 6, wherein the protective layer includes particles, and the method further comprises of
   recording an image of the particles; and
   authenticating the fastener using the image of the particles.

8. The method of tamper identification as in claim 1, further comprising applying a clear, protective layer to the tamper identification surface.

9. The method of tamper identification as in claim 1, creating a tool specifically designed for altering the grain structure of the first portion at one or more predetermined locations, wherein the applying torque further comprises applying the tool to the fastener.

10. The method of tamper identification as in claim 1, wherein the determining further comprises etching or dyeing the tamper identification surface.

11. The method of tamper identification as in claim 1, further comprising applying an identification tag to the fastener.

12. The method of tamper identification as in claim 11, further comprising authenticating the fastener by referencing the identification tag.

13. The method of tamper identification as in claim 1, wherein the determining further comprises:
viewing a magnified image of the grain structure of the first portion.

14. The method of tamper identification as in claim 13, wherein the determining further comprises:
locating individual grains in the reference image; and
ascertaining differences in the shape, location, or both, of the individual grains in the verification image.

15. The method of tamper identification as in claim 13, wherein the determining further comprises:
locating individual grain boundaries in the reference image; and
determining where the individual grains intersect a reticle used in viewing the magnified image.

16. The method of tamper identification as in claim 1, further comprising:
converting the reference image into encrypted reference data; wherein the determining further comprises decrypting the encrypted reference data.

17. The method of tamper identification as in claim 1, further comprising authenticating the fastener by referencing an image of grain structure of the second portion of the fastener.

* * * * *